United States Patent [19]
Inami et al.

[11] Patent Number: 5,559,669
[45] Date of Patent: Sep. 24, 1996

[54] COMPRESSED GAS INSULATION SWITCHGEAR

[76] Inventors: Yoshiaki Inami; Toyokazu Tanaka; Masahira Wachi, all of Kokubu Works of Hitachi, Ltd. 1-1, Kokubumachi 1-chome, Hitachi-shi, Ibaraki-ken, Japan

[21] Appl. No.: 405,353

[22] Filed: Mar. 16, 1995

Related U.S. Application Data

[63] Continuation-in-part of Ser. No. 79,798, Jun. 23, 1993, Pat. No. 5,450,281, which is a continuation-in-part of Ser. No. 935,405, Aug. 26, 1992, abandoned.

[30] Foreign Application Priority Data

Mar. 18, 1994 [JP] Japan .................... 6-048259

[51] Int. Cl.$^6$ .................................................. H02B 5/00
[52] U.S. Cl. .................................................. 361/612
[58] Field of Search ........................... 361/611, 612, 361/618, 620, 621, 624

[56] References Cited

U.S. PATENT DOCUMENTS 4,821,141  4/1989  Torimi et al. ..................... 361/612
5,126,917  6/1992  Matsuda ........................... 361/612

FOREIGN PATENT DOCUMENTS 3049510  3/1991  Japan ..................... 361/612
3145913  6/1991  Japan ..................... 361/612
5-56520  3/1993  Japan .
5-219615  8/1993  Japan .

*Primary Examiner*—Gregory D. Thompson
*Attorney, Agent, or Firm*—Bardehle, Pagenberg, Dost, Altenburg, Frohwitter, Geissler and Partners

[57] ABSTRACT

The present invention provides a compressed gas insulation switchgear requiring a comparatively small area for installation and facilitating installation of additional banks. According to one embodiment of the invention, potential current transformer units are disposed in the central area, power receiving units are disposed on the outer side of the potential current transformer units, transformer side units are disposed on the outer side of the power receiving units, and buses interconnecting the units are extended in parallel to a row of cubicles on an upper level and a lower level.

6 Claims, 16 Drawing Sheets

COMPRESSED GAS INSULATION SWITCHGEAR

CLAIM TO PRIORITY OF U.S. APPLICATION

This application is a continuation-in-part of U.S. application Ser. No. 08/079,798, now U.S. Pat. No. 5,450,281, filed Jun. 23, 1993, which is a continuation-in-part of U.S. application Ser. No. 07/935,405, filed Aug. 26, 1992, now abandoned.

BACKGROUND OF THE INVENTION

The present invention relates to a gas insulation switchgear, and more particularly, to a compressed gas insulation switchgear for a commercial extra-high voltage power receiving and transforming facility.

Conventional compressed gas insulation switchgears for commercial extra-high voltage power receiving and transforming facilities are classified into those of a single metering system and those of a dual metering system. As described, for example, in Japanese Patent Laid-open (Kokai) No. 1-303002, the compressed gas insulation switchgear of the former metering system receives power through two lines, and has one potential current transformer and two transformers connected to the potential current transformer. Although this compressed gas insulation switchgear receives power through the two lines to enhance reliability in power supply, power supply to the customer must be stopped when the potential current transformer is stopped for inspection or replacement. As described, for example, in Japanese Patent hid-open (Kokai) No. 1-248911, the compressed gas insulation switchgear of the latter metering system is provided with two potential current transformers, and one of the two potential current transformers is used for measuring consumed electric energy while the other potential current transformer is stopped for inspection to avoid stopping power supply.

FIG. 15 is a skeleton diagram of the compressed gas insulation switchgear of the latter metering system.

The respective transformer ends of two power receiving units LU1 and LU2 are interconnected by a connecting conductor CU1, the respective receiving ends of transformer side units TU1 and TU2 are interconnected by a connecting conductor CU2, and two potential current transformer units PU1 and PU2 are in parallel to the connecting conductors CU1 and CU2. When inspecting a potential current transformer 13 or replacing the same with another one, disconnectors connected respectively to the opposite ends of the potential current transformer unit PU1 are operated to disconnect the potential current transformer unit PU1 from the circuit, and the other potential current transformer unit PU2 is connected to the circuit, so that power supply to the customer is not interrupted.

Although the compressed gas insulation switchgear provided with the two potential current transformers is able to avoid the stoppage of power supply to the customer as mentioned above, the compressed gas insulation switchgear is very large as compared with a compressed gas insulation switchgear provided with one potential current transformer. FIG. 16 is a plan view of the compressed gas switchgear shown in FIG. 15 in a skeleton diagram.

The two power receiving units LU1 and LU2 are disposed opposite to each other, the respective transformer side ends of the power receiving units LU1 and LU2 are interconnected by the connecting unit CU1, the transformer side units TU1 and TU2 on the side of transformers TR1 and TR2 are disposed opposite to each other, the respective power receiving ends are interconnected by the connecting units CU2, and the potential current transformer units PU1 and PU2 respectively provided with the potential current transformers 13 are connected in parallel to the connecting units CU1 and CU2. Since the components of the compressed gas insulation switchgear are arranged in a closed loop in a plane, the compression gas insulation switchgear needs a very large area for installation.

In FIG. 17 and in a plan view in FIG. 18, a compressed gas insulation switchgear is show, similar to that disclosed in Japanese Patent Application No. 4-256618 (incorporated herein by reference), which was laid open after the priority date of the present application, and therefore is not prior art. The switch gear shown in FIG. 17 and 18 comprises two potential current transformer units PU1 and PU2, transformer side units TU1 and TU2 disposed respectively on the opposite ends of the two potential current transformer units PU1 and PU2, and power receiving units LU1 and LU2 disposed respectively on the respective outer sides of the transformer side units TU1 and TU2. This compressed gas insulation switchgear needs a comparatively small area for installation. Also, this switch gear is provided with two potential current transformer units PU1 and PU2 and provides enhanced power supply reliability while reducing the area required for installation. However, when installing another bank to deal with increase in power demand, the connection of an additional transformer side unit and the secondary side of an additional potential current transformer is obstructed by the power receiving unit LU1 when the components are arranged as shown in FIG. 18. Consequently, when the additional transformer unit is installed on the outer side of the power receiving unit in a line, a connecting bus cannot be extended linearly, much time and labor is required to install the connecting bus, and the size of the compressed gas insulation switchgear increases.

If trouble occurs in the connecting unit CU2 interconnecting the secondary sides of the potential current transformer units PU1 and PU2 of the compressed gas insulation switchgears shown in FIGS. 15 and 17 in skeleton diagrams, the transformer TR2 is stopped when the potential current transformer unit PU1 is a service potential current transformer unit and the potential current transformer unit PU2 is a standby potential current transformer unit or the transformer TR1 is stopped when the potential current transformer unit PU1 is a standby potential current transformer unit and the potential current transformer unit PU2 is a service potential current transformer unit and, consequently, the compressed gas insulation switchgear is unable to continue normal operation.

Two other documents also show in-row cubicles, but poor transformer tap access. They are: (1) Japanese application number 5-56520, laid open Mar. 5, 1993, and the subject of a U.S. application number Ser. No. 08/079,798, having an inventor in common with the present application and being commonly owned, priority to which is claimed herein, and (2) Japanese application number 5-21965, laid open Apr. 27, 1993.

A first object of the present invention is to provide a compressed gas insulation switchgear that can be installed in a comparatively small area.

A second object of the present invention is to provide a compressed gas insulation switchgear capable of readily dealing with installing an additional bank.

SUMMARY OF THE INVENTION

With the first object in view, the present invention provides a compressed gas insulation switchgear comprising cubicles of potential current transformer units, cubicles of transformer side units, cubicles of a transformer side units, and buses interconnecting the potential current transformer units, the power receiving units, and the transformer side units; characterized in that the cubicles are arranged in a row, the power receiving units are disposed on the outer side of the potential current transformer units, the transformer side units are disposed on the outer side of the power receiving units, the buses connecting the respective primary sides of the potential current transformer units to the power receiving units are extended on an upper level, the buses connecting the respective secondary sides of the potential current transformer units to the transformer side units are extended on an lower level, and the buses are extended in parallel to the row of the cubicles.

With the second object in view, the present invention provides a compressed gas insulation switchgear comprising cubicles of potential current transformer units, cubicles of power receiving units, cubicles of transformer side units, and buses interconnecting the potential current transformer units, the power receiving units, and the transformer side units; characterized in that the cubicles are arranged in a row, the power receiving units are disposed on the outer side of the potential current transformer units, the transformer side units are disposed on the outer side of the power receiving units, the buses interconnecting the units are extended in parallel to the row of the cubicles.

In the compressed gas insulation switchgear in the first aspect of the present invention, the power receiving units are disposed on the outer side of the one or the two potential current transformer units, the transformer side units are disposed on the outer side of the power receiving units, the buses connected to the respective primary sides of the potential current transformers are extended in parallel to the row of the cubicles on an upper level, and the buses connected to the respective secondary sides of the potential current transformer units are extended in parallel to the row of the cubicles on a lower level. Such an arrangement of the components reduces greatly the area necessary for installing the compressed gas insulation switchgear.

In the compressed gas insulation switchgear in the second aspect of the present invention, the transformer side units are disposed on the outer ends of the arrangement of the components of the compressed gas insulation switchgear. Accordingly, when incorporating additional banks into the compressed gas insulation switchgear, additional transformer side units equivalent to the existing transformer side units may be disposed on the outer side of the existing transformer side units, which saves labor necessary for installing the additional banks and suppresses increase in size of the compressed gas insulation switchgear.

According, therefore, to an embodiment of the invention, there is provided a gas insulation switchgear comprising a potential current transformer unit (PU), a power receiving units (LU), a transformer side units (TU), wherein: the PU, the LU, and the TU being electrically connected by buses; and the power receiving unit resides between the potential current transformer unit and the transformer side unit. According to a further embodiment, there is further provided multiple potential current transformer units, multiple power receiving units, and multiple transformer side units, wherein the cubicles of the multiple potential current transformer units, multiple power receiving units, and multiple transformer side units, are arranged in a row. According to still a further embodiment, the buses are extended in parallel to the row, at least two potential current transformer units are disposed next to each other and there is further provided a primary bus connecting the respective primary sides of at least two potential current transformer units to at least two power receiving units and extending on an upper level, and a secondary bus connecting the respective secondary sides of at least two potential current transformer units to at least two transformer side units and extending on a lower level. According to an even further embodiment, the buses connecting the respective secondary sides of the potential current transformer units to the transformer units have a double bus construction and are extended below the buses connecting the respective primary sides of the potential current transformer units to the power receiving units.

DESCRIPTION OF THE DRAWINGS

For a more complete understanding of the present invention and for further advantages thereof, reference is made to the following Detailed Description taken in conjunction with the accompanying drawings, in which.

Figure 1:
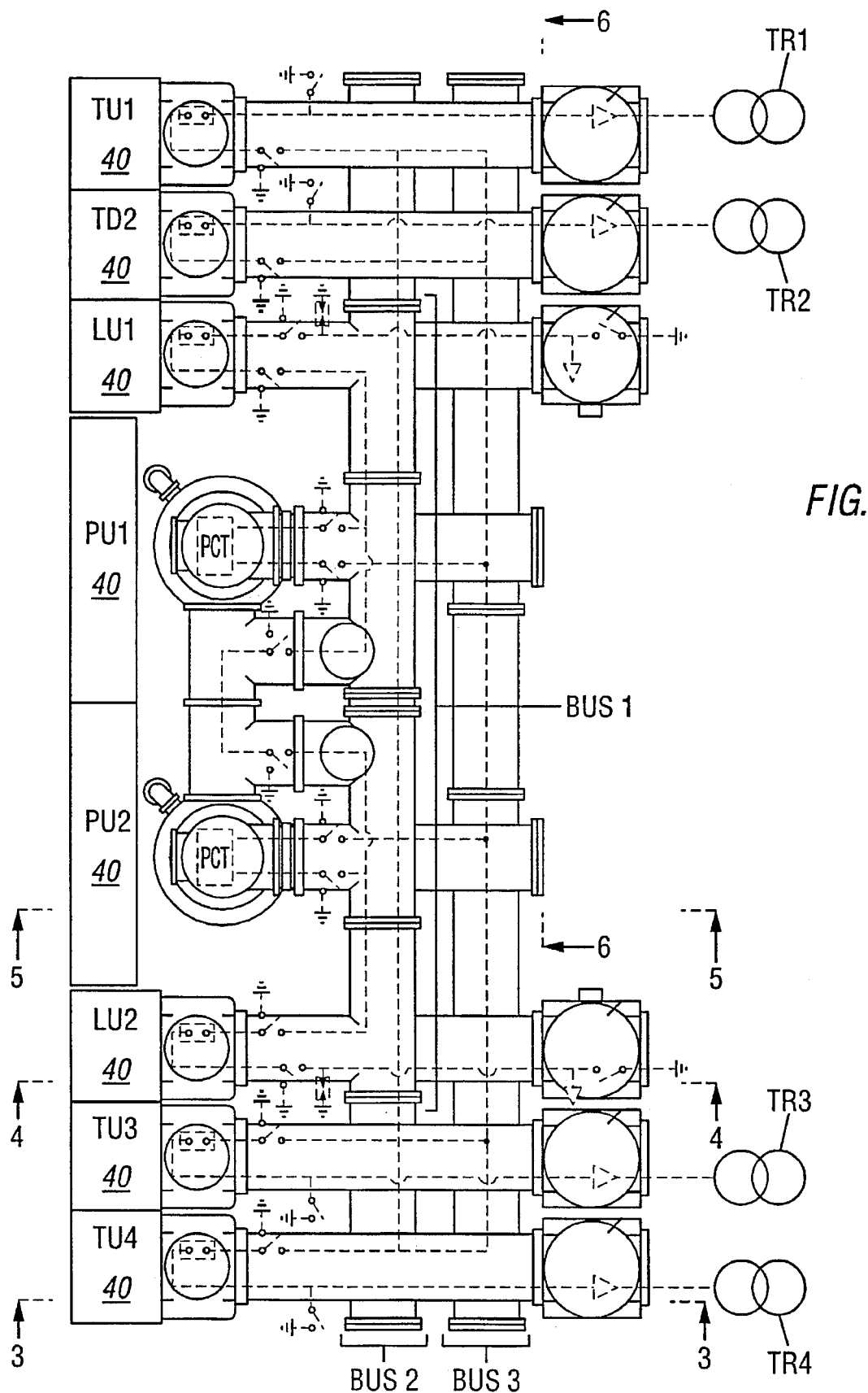
FIG. 1 is a plan view of a compressed gas insulation switchgear in a preferred embodiment according to the present invention.

Reference Characters:

Power receiving units, LU1, LU2
Transformer side units TU1, TU2
Potential current transformer units PU1, PU2

Transformers TR1, TR2
Buses CU1, CU2, BUS1, BUS2, BUS3
Current transformer 1
Cable heads 2, 21
Grounding switches 2, 7, 10, 12, 15, 18, 20, 23, 25, 27, 29
Arrester 4
Arrester switch 5
Disconnectors 6, 9, 11, 14, 16, 17, 22, 24, 26
Circuit breakers 8, 19
Potential current transformer 13
Connecting conductors 30, 31
Branching points 33, 34
Adapter 39
Operating cubicle 40
Duct 41–46
Bus duct 50

It is to be noted, however, that the appended drawings illustrate only typical embodiments of this invention and are therefore not to be considered limiting of its scope, for the invention may admit to other equally effective embodiments.

DETAILED DESCRIPTION OF EMBODIMENTS OF THE INVENTION

Figure 19:
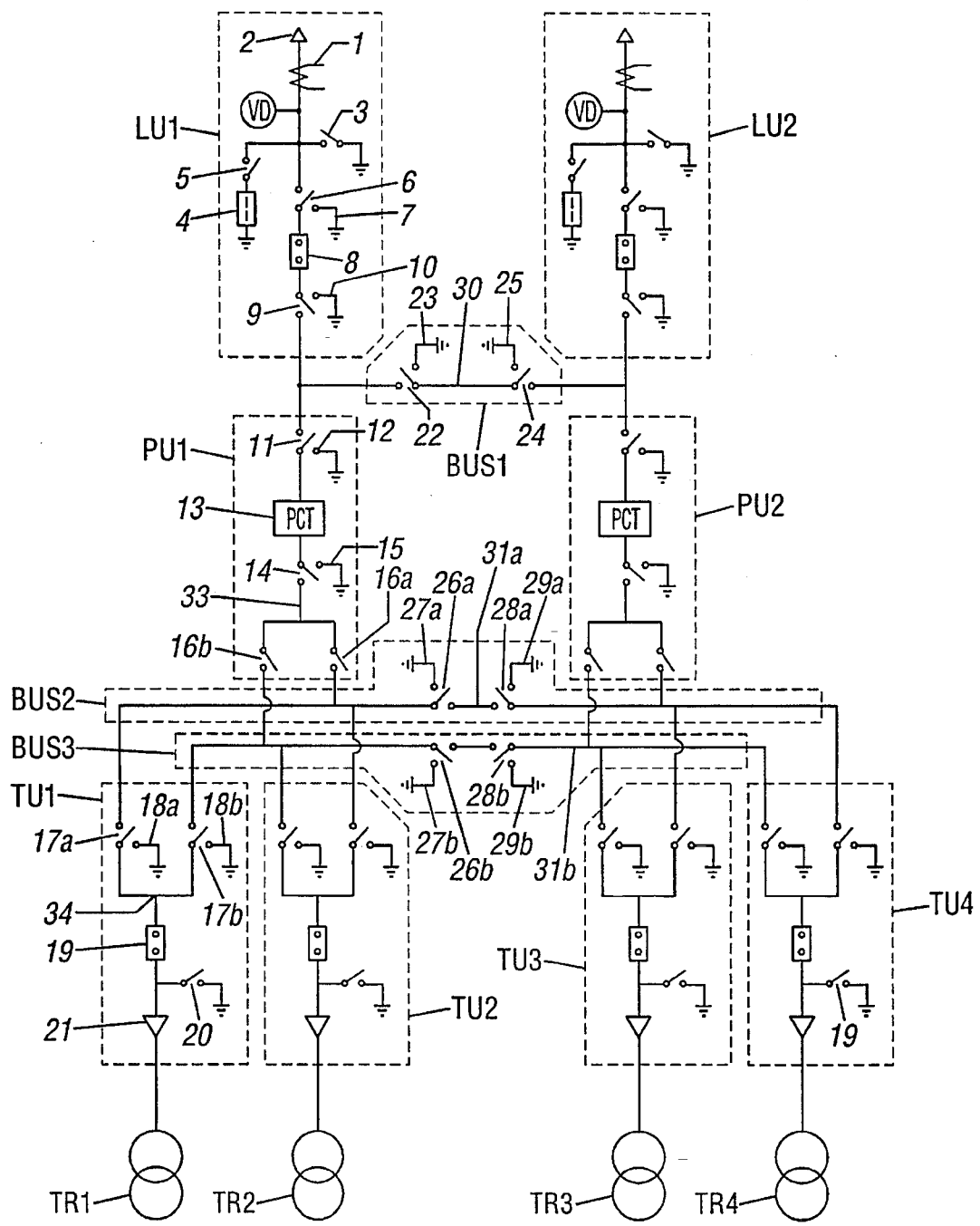
FIG. 19 is a skeleton diagram of potential current transformers having secondary sides connected to double buses.

FIG. 19 is a skeleton diagram of a four-bank compressed gas insulation switchgear of a two-line power reception double metering system having double buses connected to the secondary sides of potential current transformers. FIG. 1 is a skeleton diagram of a commercial extra-high voltage power receiving facility corresponding to the compressed gas insulation switchgear in a preferred embodiment according to the present invention. Since two power receiving units LU1 and LU2, two potential current transformer units PU1 and PU2, and four transformer side units TU1, TU2, TU3 and TU4 are identical, respectively, only the power receiving unit LU1, the potential current transformer unit PU1 and the transformer side unit TU1 will be described.

In the power receiving unit LU1, a main conductor connected to a cable head 2 and penetrating a current transformer 1 is connected through a disconnector 6 to one end of a circuit breaker 8, and the other end of the circuit breaker 8 is connected to a disconnector 9. A grounded arrester 4 is connected through an arrester switch 5 and one end of a grounding switch to a point on a line extending between the cable head 2 and the disconnector 6. Grounding switches 7 and 10 are connected to lines connecting the disconnectors 6 and 9 to the circuit breaker 8, respectively. The potential current transformer unit PU1 has an potential current transformer 13, and disconnectors 11 and 14 connected respectively to the opposite ends of the potential current transformer 13. Grounded grounding switches 12 and 15 are connectable to the potential current transformer 13. The potential current transformer 13 is connected through a branching point 33 to disconnectors 16a and 16b connected respectively to secondary side buses BUS2 and BUS3. The transformer side unit TU1 has a circuit breaker 19 having one end connected through a branching point 34 to disconnectors 17a and 17b and grounded grounding switches 18a and 18b, and the other end connected to a grounded grounding switch 20, and a cable head 21 connected to a transformer TR1.

The respective transformer side ends of the power receiving units LU1 and LU2, and the respective primary sides of the potential current transformer units PU1 and PU2 are interconnected by a bus BUS1. Disconnectors 22 and 24 are inserted in a conductor 30 of the bus BUS1 extending between the potential current transformer units PU1 and PU2, and grounding switches 23 and 25 are connected respectively to the disconnectors 22 and 24. The power receiving sides of the transformer side units TU1 to TU4 and the secondary sides of the potential current transformer units PU1 and PU2 are interconnected by the set of buses BUS2 and BUS3. Disconnectors. 26a–b and 28a–b are inserted in connecting conductors 31a and 31b extending between the potential current transformer units PU1 and PU2, and grounding switches 27a–b and 29a–b are connected respectively to the disconnectors 26a–b and 28a–b. Since the respective secondary sides of the potential current transformer units PU1 and PU2, and the power receiving ends of the transformer side units TU1 and TU2 are interconnected in a double bus system, all the banks are not stopped simultaneously even if trouble occurs in the buses connected to the secondary sides of the potential current transformers.

Figure 2:
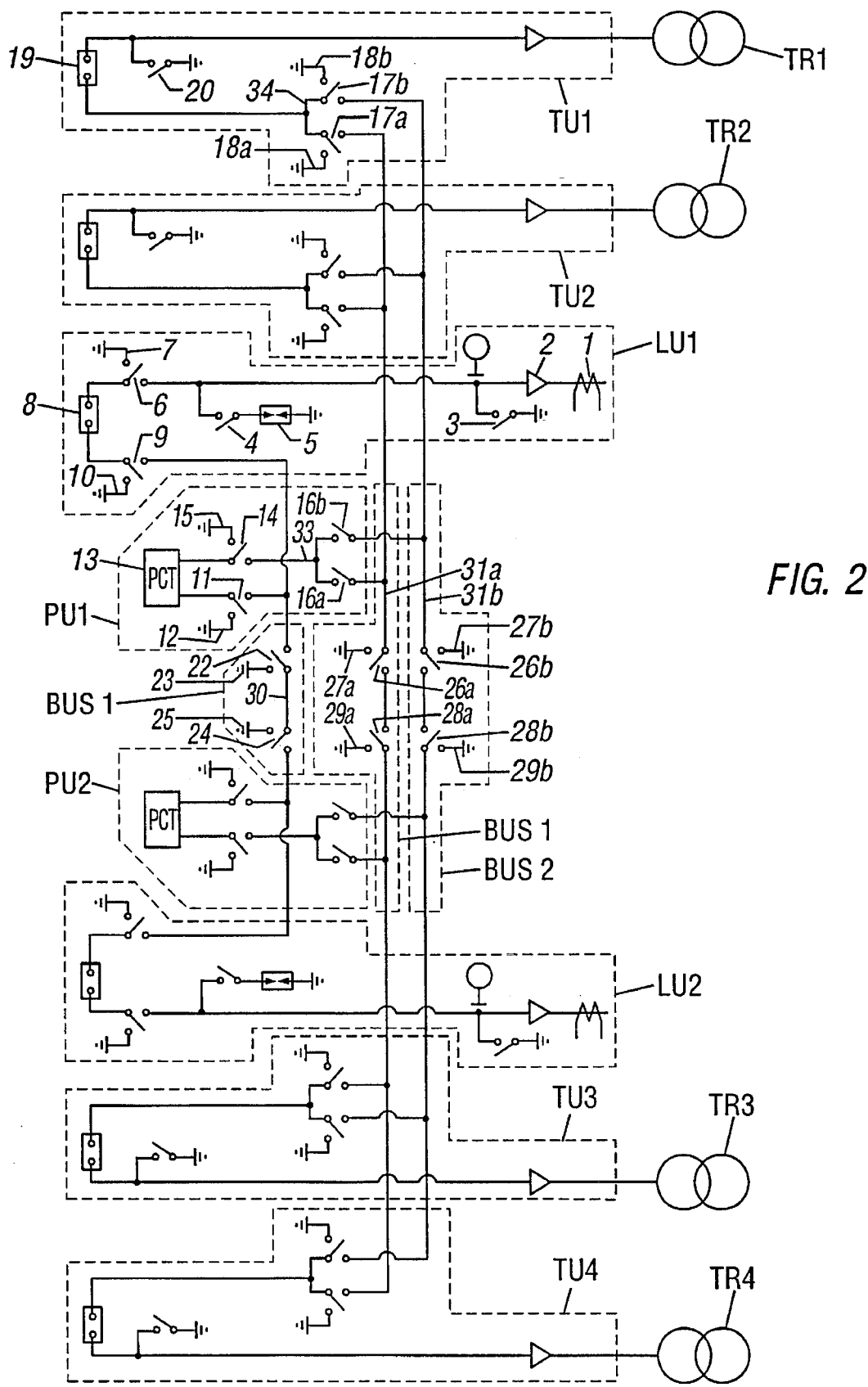
FIG. 2 is a skeleton diagram of the compressed gas insulation switchgear of FIG. 1.

FIG. 1 is a plan view of a compressed gas insulation switchgear in an embodiment according to the present invention shown in FIG. 2 in a skeleton diagram. The two potential current transformer units PU1 and PU2 are disposed in the central area, and the power receiving units LU1 and LU2 are disposed on the outer side of the potential current transformer units PU1 and PU2, respectively. The respective primary sides of the potential current transformer units PU1 and PU2 are connected to the power receiving units LU1 and LU2, respectively, by the bus BUS1 on the primary sides of the potential current transformers. The buses BUS2 and BUS3 on the secondary sides of the potential current transformers are extended under the BUS1 so as to interconnect the transformer side units TU1 to TU4 disposed on the outer side of the power receiving units LU1 and LU2 and the respective secondary sides of the potential current transformer units PU1 and PU2. The operating cubicles 40 of the foregoing units are arranged in a row on the front side of the compressed gas insulation switchgear, and the primary side bus BUS 1 and the secondary side buses BUS2 and BUS3 are extended on an upper level and a lower level, respectively, in parallel to the row of the cubicles 40.

Figure 3:
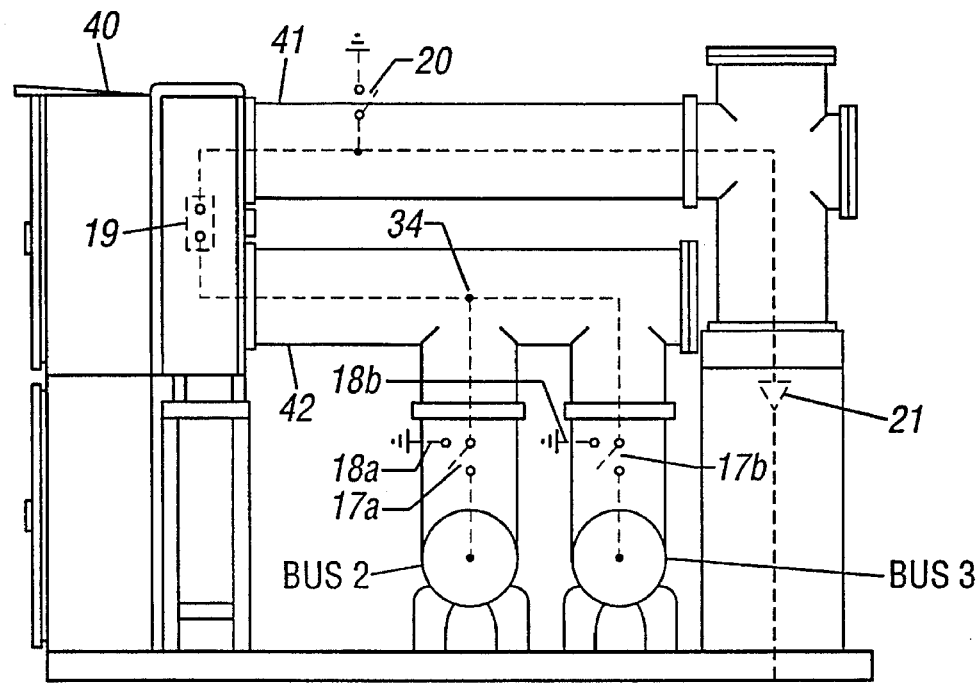
FIG. 3 is a sectional view taken on line A—A in FIG. 1.

FIG. 3 is a sectional view taken on line A—A in FIG. 1, and showing the transformer side units TU1 to TU4. An upper duct 41 and a lower duct 42 are extended away from the operating cubicle 40 from the circuit breaker 19 disposed on the back side of the operating cubicle 40. The upper duct 41 extends through the grounding switch 20 to the cable head 21. Branch ducts extend from a branching point 34 on the lower duct. 42, and the branch ducts are connected through the disconnectors 17a and 17b respectively having the grounding switches 18a and 18b to the secondary side buses BUS2 and BUS3, respectively.

Figure 4:
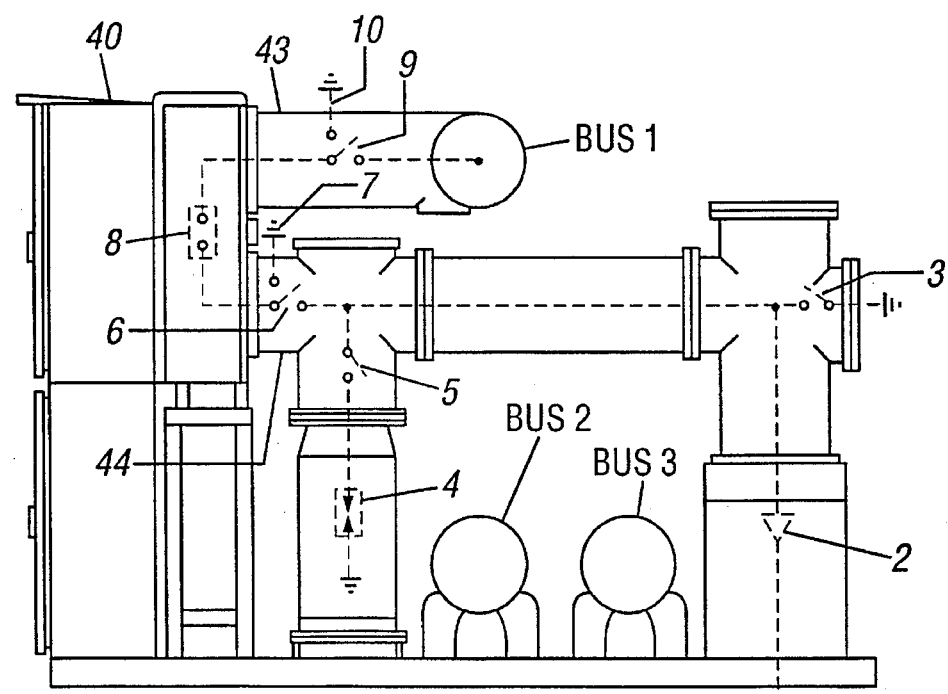
FIG. 4 is a sectional view taken on line B—B in FIG. 1.

FIG. 4 is a sectional view taken on line B—B in FIG. 1, and showing the power receiving units LU1 and LU2 in a side view. An upper duct 43 and a lower duct 44 extend away from the operating cubicle 40 from the circuit breaker 8 disposed on the back side of the operating cubicle 40. The upper duct 43 extends through the circuit breaker 9 having the grounding switch 10 to the primary side bus BUS1. The lower duct 44 extend through the disconnector 6 having the grounding switch 7, the arrester 4 having the lightening switch 5, and the grounding switch 3 to the cable head 2. The secondary side bus BUS2 and BUS3 are extended in a space between the arrester 4 and the cable head 2.

Figure 5:
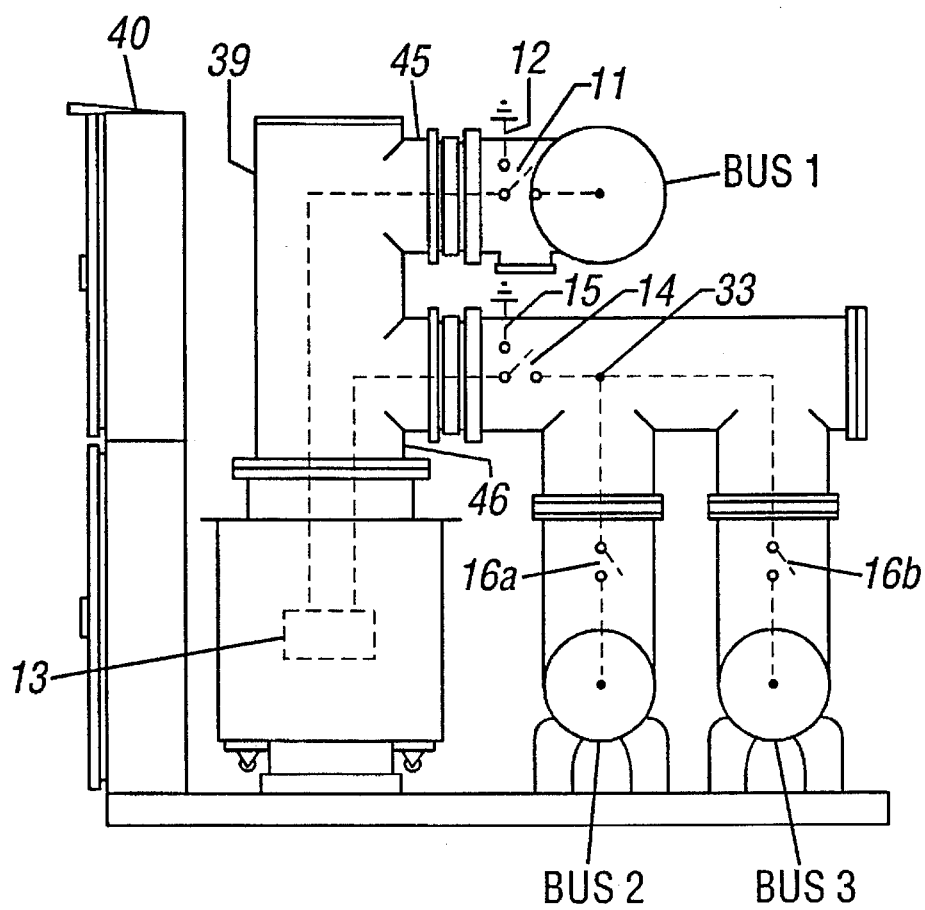
FIG. 5 is a sectional view taken on line C—C in FIG. 1.

FIG. 5 is a sectional view taken on line C—C in FIG. 1 and showing the potential current transformer units PU1 and PU2 in a side view. An upper duct 45 and a lower duct 46 extend away from the operating cubicle 40 from an adapter 39 connected to the potential current transformer 13 disposed on the back side of the operating cubicle 40. The upper duct 45 extends through the disconnector 11 having the grounding switch 12 to the primary side bus BUS1. The lower duct 46 extends through the disconnector 14 having the grounding switch 15, is branched at a branching point 33, and branch ducts branched from the lower duct 46 are connected to the secondary side buses BUS2 and BUS3. The disconnectors 16a and 16b are disposed between the branching point 33 and the secondary bus BUS2 and between the branching point 33 and the secondary bus BUS3, respectively.

Figure 6:
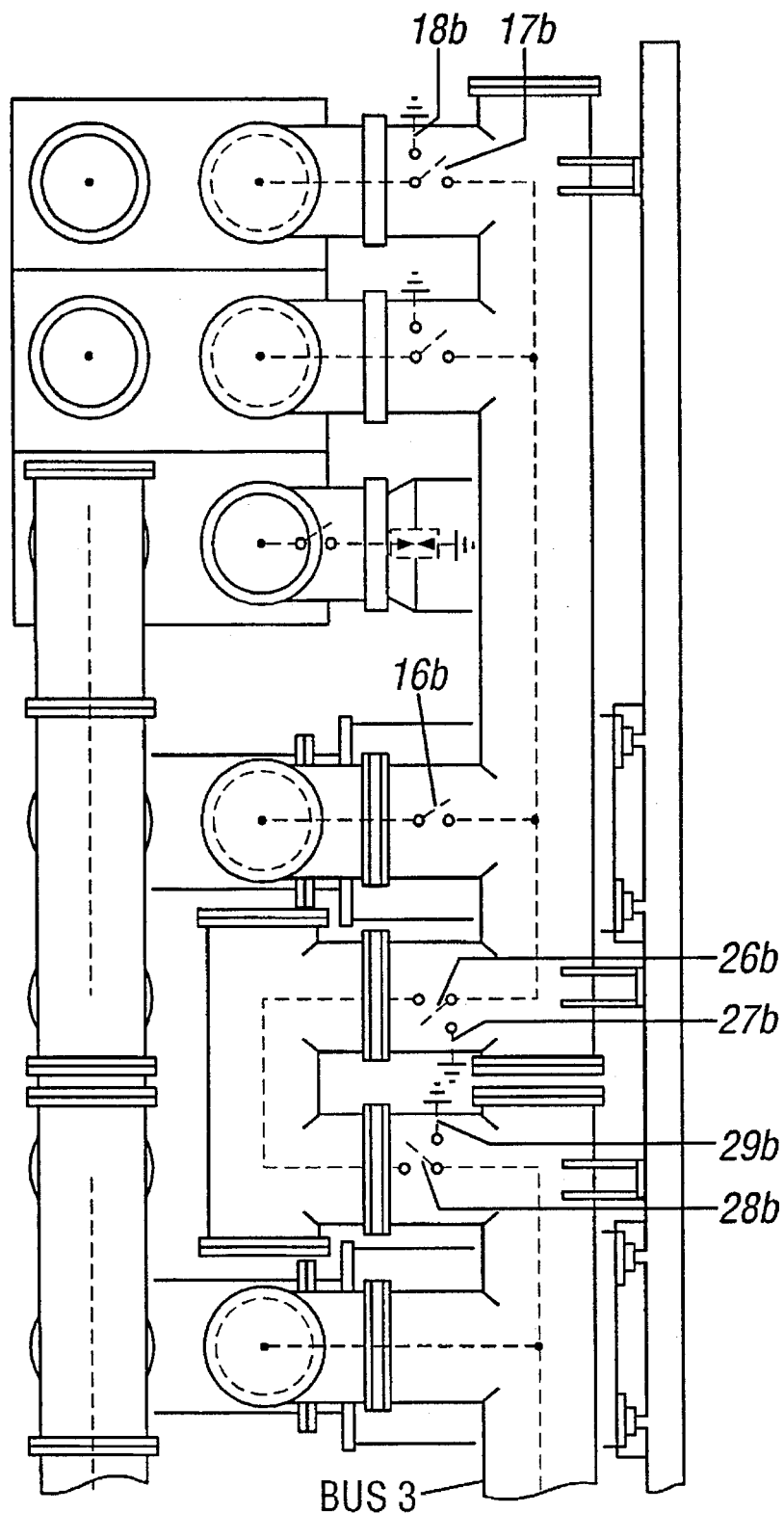
FIG. 6 is a sectional view taken on line D—D in FIG. 1.

FIG. 6 is a sectional view taken on line D—D in FIG. 1. The potential current transformer units PU1 and PU2, and the transformer side units TR1 to TR4 are interconnected by the secondary side bus BUS3. The secondary side bus BUS2, not shown in FIG. 6, is extended behind the secondary side bus BUS3 and is the same in construction as the secondary side bus BUS3. The disconnectors 26b and 28b respectively having the grounding switches 27b and 29b are disposed between the secondary buses BUS2 and BUS3, and the potential current transformer units PU1 and PU2, respectively.

Figure 8:
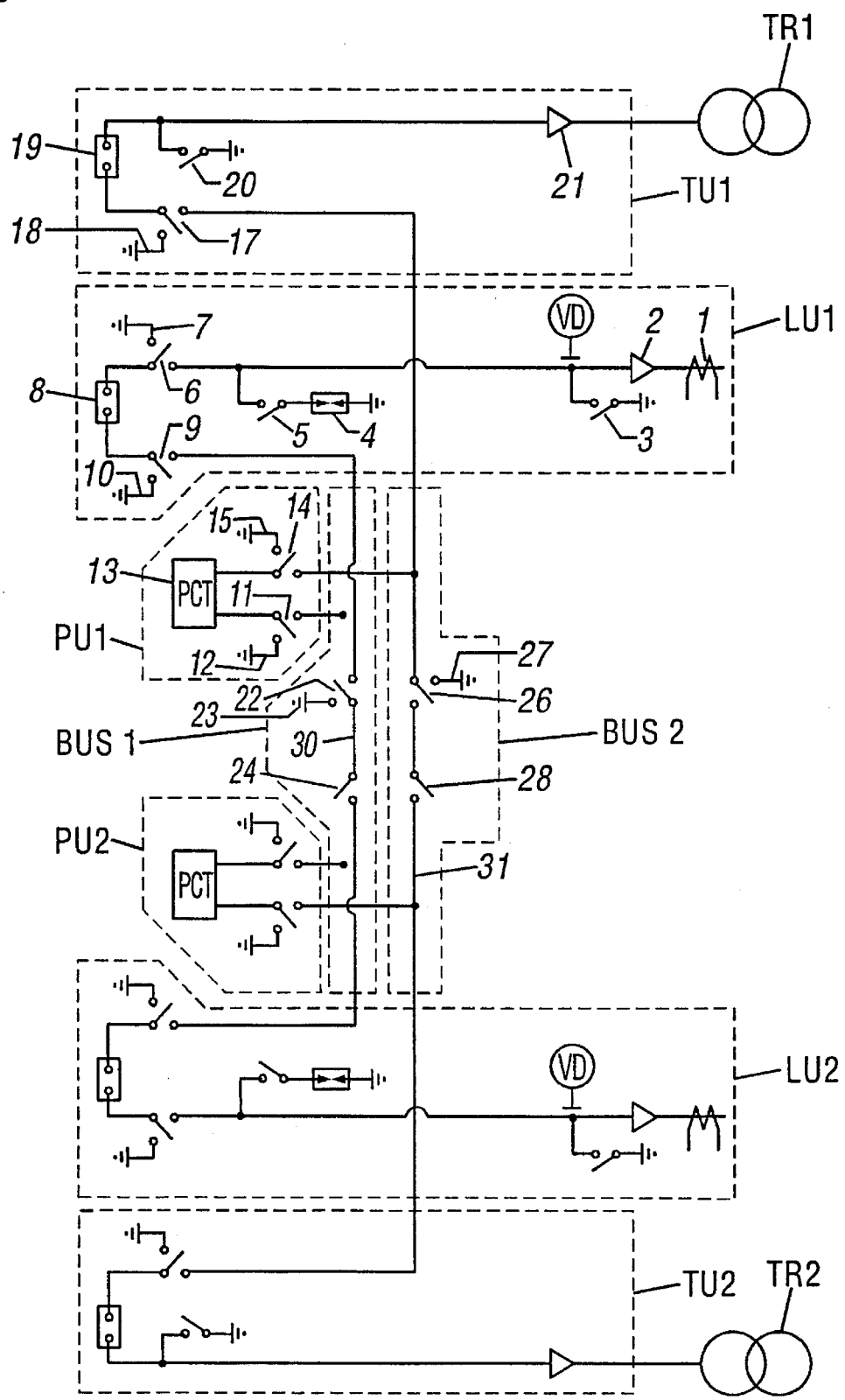
FIG. 8 is a skeleton diagram of the compressed gas insulation switchgear of FIG. 7.
Figure 15:
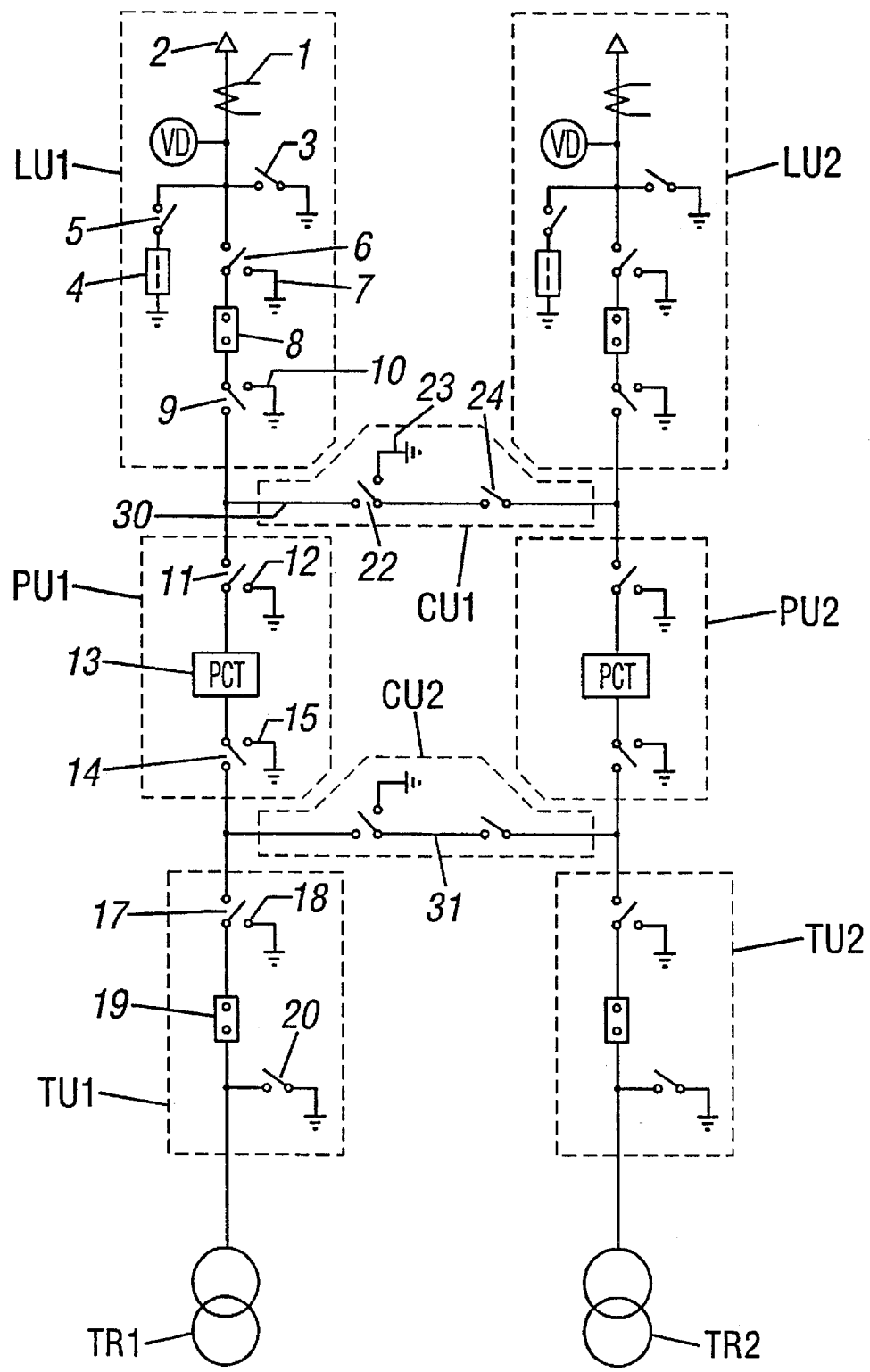
FIG. 15 is a skeleton diagram of a commercial two-bank extra-high voltage power receiving facility of a two-line power reception dual metering system.
Figure 16:
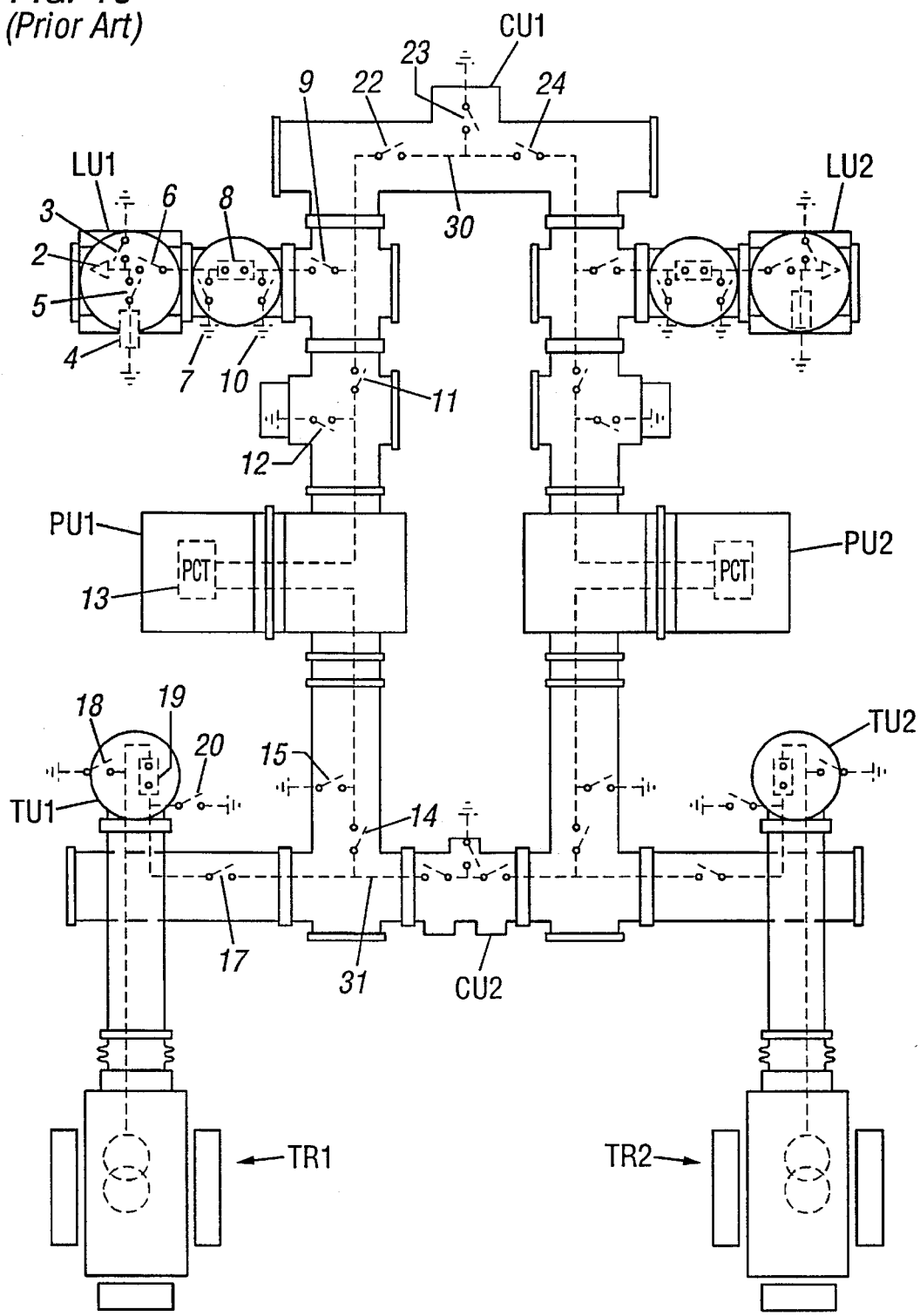
FIG. 16 is a plan view of a conventional compressed gas insulation switchgear corresponding to the commercial two-bank extra-high voltage power receiving facility of FIG. 15.
Figure 17:
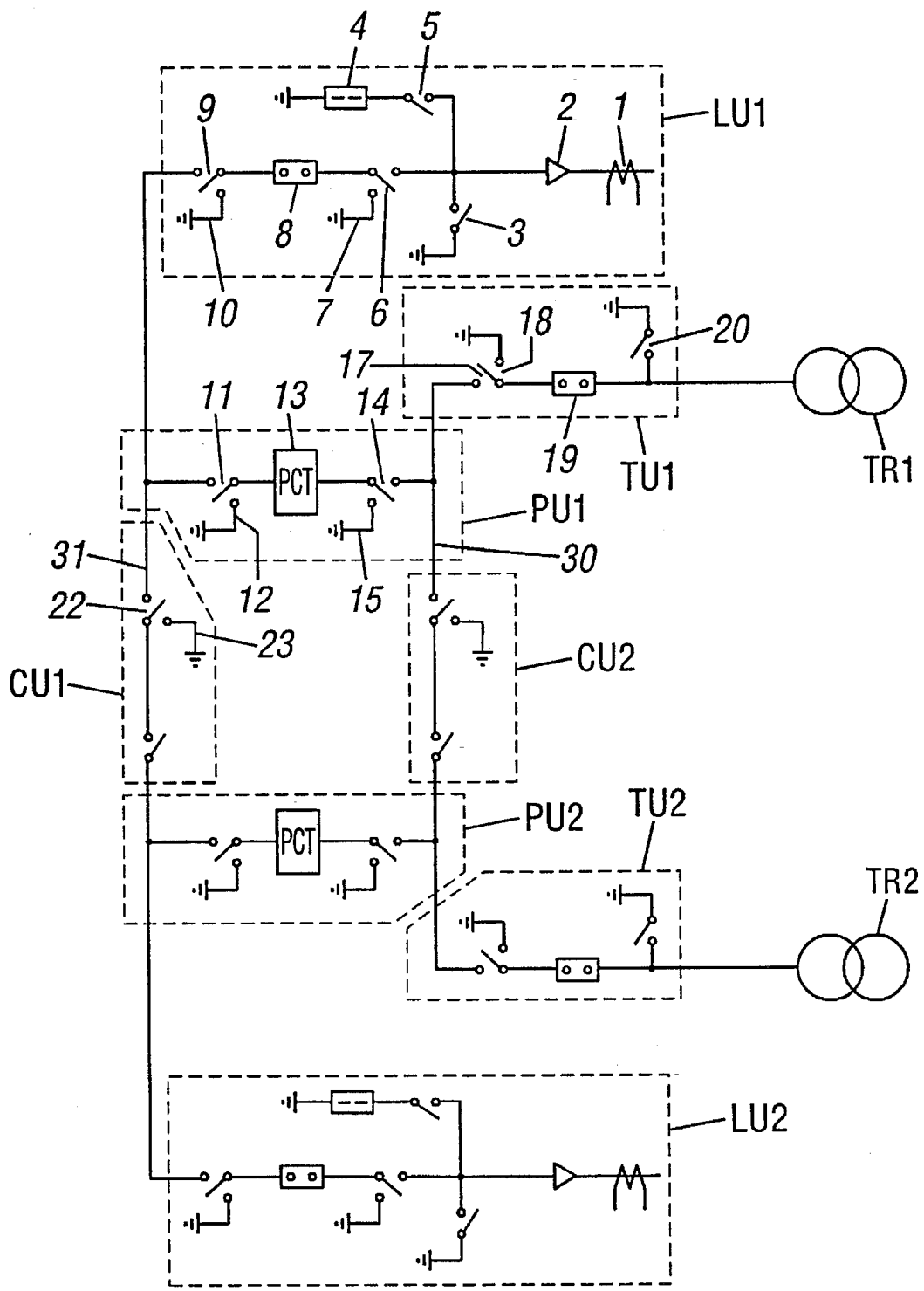
FIG. 17 is a skeleton diagram of a compressed gas insulation switchgear corresponding to the commercial two-bank extra-high voltage power receiving facility of FIG. 15.
Figure 18:
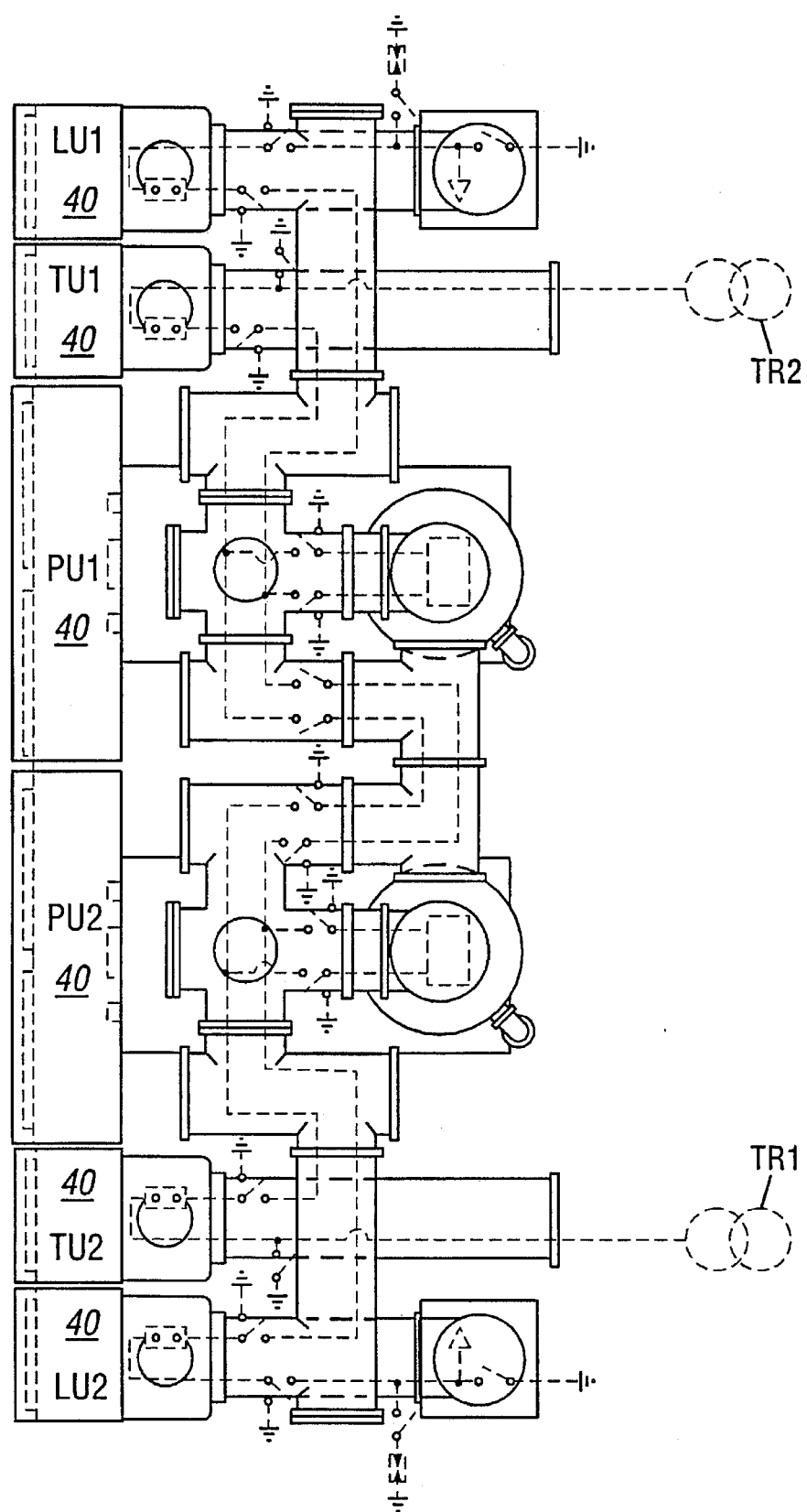
FIG. 18 is a plan view of the compressed gas insulation switchgear of FIG. 16 formed in a compact construction by the conventional technique.

FIG. 8 is a skeleton diagram of a compressed gas insulation switchgear in accordance with an embodiment of the present invention corresponding to the commercial extra-high voltage power receiving facility shown in a skeleton diagram in FIG. 15. The compressed gas insulation switchgear shown in FIG. 8, similarly to that shown in FIG. 2, comprises two identical power receiving units LU1 and LU2, two identical potential current transformer units PU1 and PU2, and two identical transformer units TU1 and TU2. The power receiving units LU1 and LU2 are the same as those shown in FIG. 2. Since the secondary sides of the potential current transformer units PU1 and PU2 are connected to a single bus, the compressed gas insulation switchgear its not provided with any components corresponding to the disconnectors 16a and 16b for selectively using either of the buses BUS1 and BUS2 shown in FIG. 2 and, for the same reason, each of the transformer side units TU1 and TU2 is provided with one grounding switch instead of the grounding switches 18a and 18b shown in FIG. 2 and one grounding switch instead of the grounding switches 17a and 17b shown in FIG. 2. The respective transformer sides of the power receiving units LU1 and LU2 and the respective primary sides of the potential current transformer units PU1 and PU2 are interconnected by a bus BUS1. Disconnectors 22 and 24 are inserted in a portion of the bus BUS1 between the potential current transformer units PU1 and PU2. The disconnector 22 can be connected to a grounded grounding switch 23. The configuration shown in a skeleton diagram in FIG. 8 is identical with that shown in FIG. 17.

Figure 7:
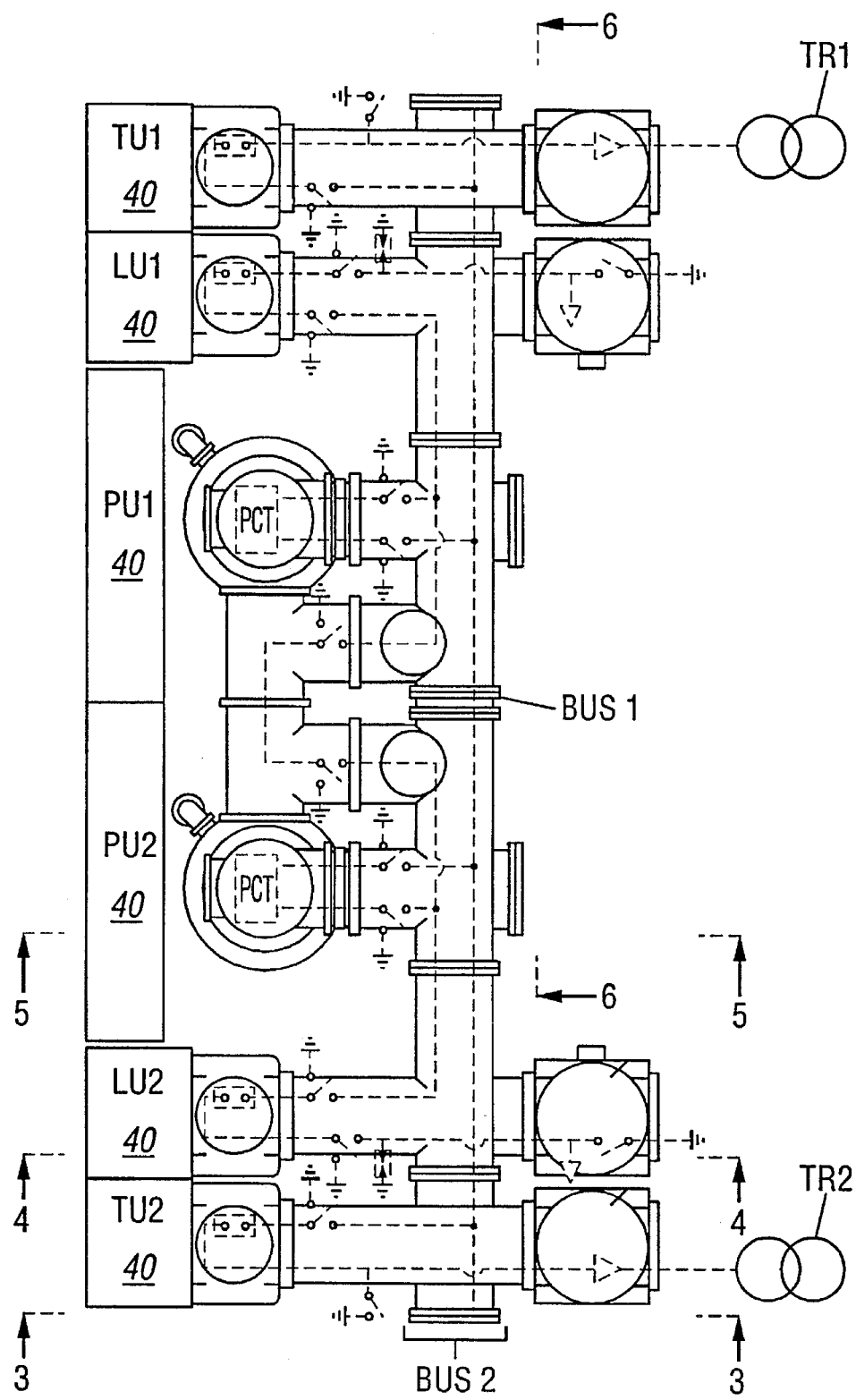
FIG. 7 is a plan view of a compressed gas insulation switchgear in another embodiment according to the present invention.
Figure 9:
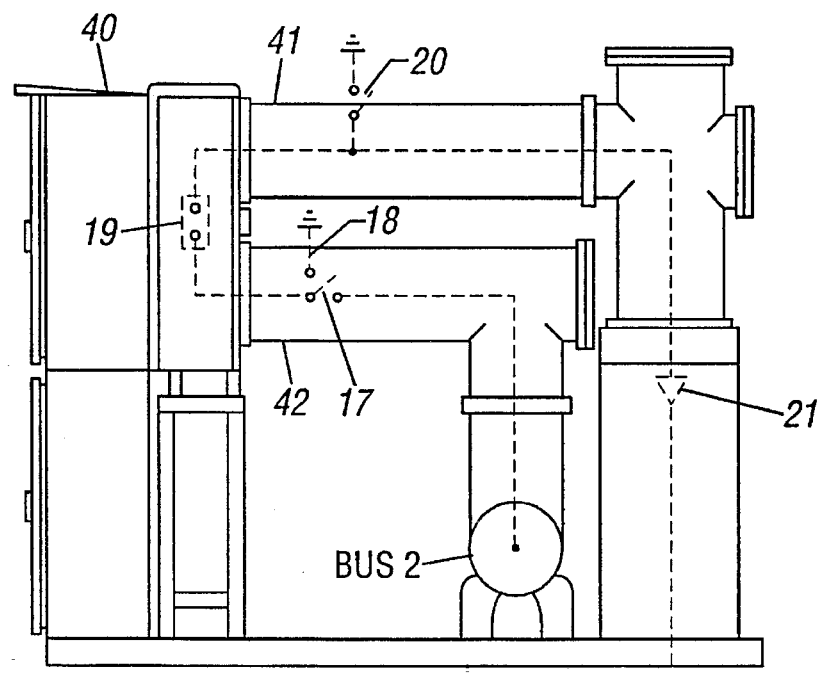
FIG. 9 is a sectional view taken on line A—A in FIG. 7.
Figure 10:
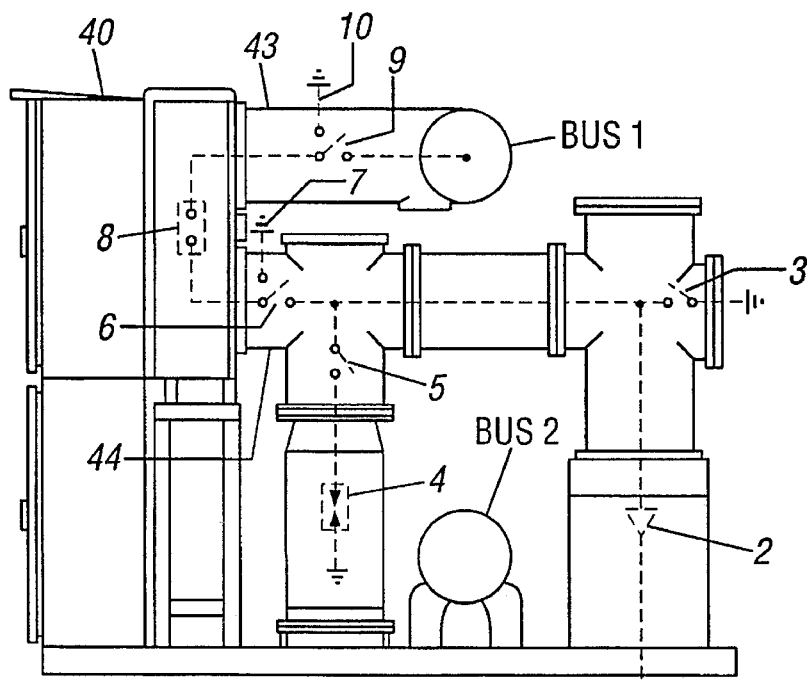
FIG. 10 is a sectional view taken on line B—B in FIG. 7.
Figure 11:
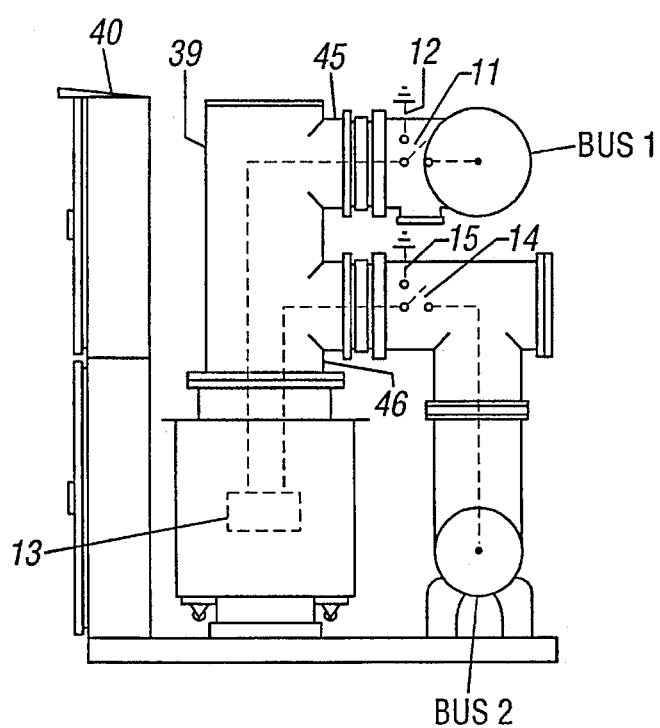
FIG. 11 is a sectional view taken on line C—C in FIG. 7.
Figure 12:
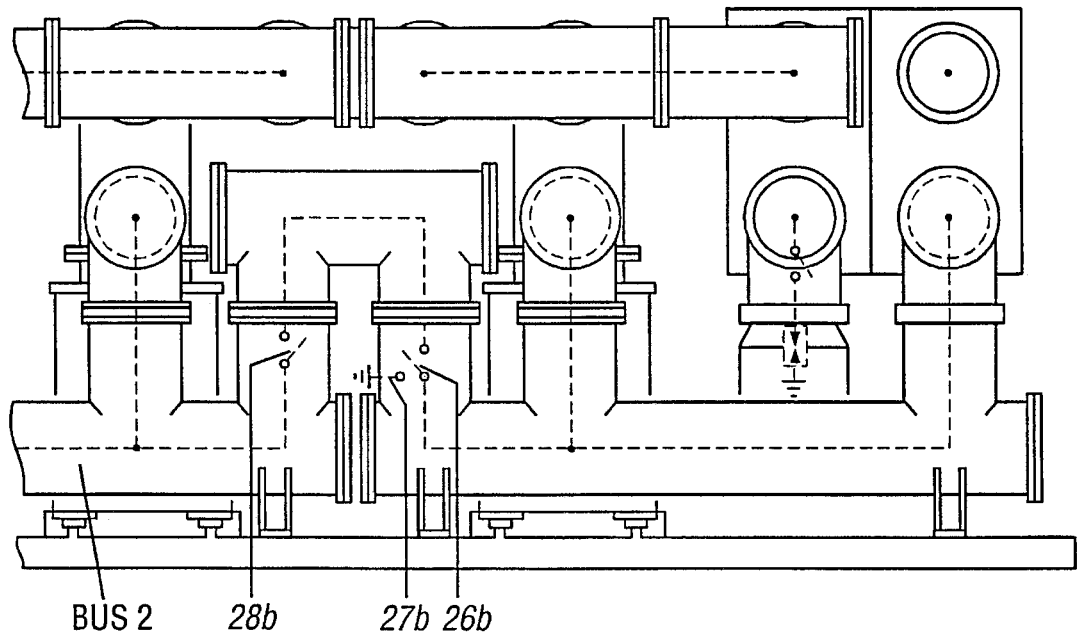
FIG. 12 is a sectional view taken on line D—D in FIG. 7.

FIG. 7 is a plan view of a compressed gas insulation switchgear in an embodiment according to the present invention having a configuration shown in a skeleton diagram in FIG. 8. The arrangement of the components of the compressed gas insulation switchgear shown in FIG. 7 is the same as that of the compressed gas insulation switchgear shown in FIG. 1, except that the former has two transformer side units, and the secondary sides of the potential current transformer units are connected to a single bus. FIG. 9 is a sectional view taken on line A—A in FIG. 7 and showing the transformer side unit in a side view. The arrangement of components shown in FIG. 9 is the same as that shown in FIG. 3, except that the arrangement shown in FIG. 9 has a single bus instead of two buses, and the position of a disconnector 17 having a grounding switch 18 is different from that of the corresponding disconnector shown in FIG. 3. FIG. 10 is a sectional view taken on line B—B in FIG. 7 showing a power receiving unit in a side view. The arrangement of components shown in FIG. 10 is the same as that shown in FIG. 4, except that the arrangement shown in FIG. 10 has a single bus interconnecting a cable head 2 and an arrester 4 instead of two buses. FIG. 11 is a sectional view taken on line C—C. in FIG. 7 and showing the potential current transformer unit in a side view. The arrangement of components shown in FIG. 11 is the same as that shown in FIG. 5, except that the arrangement shown in FIG. 11 has a single bus instead of two buses and is not provided with any components corresponding to the disconnectors 16a and 16b for changing the service bus. FIG. 12 is a sectional view taken on line D—D in FIG. 7. The respective secondary sides of the potential current transformer units PU1 and PU2 are connected to the transformer side units TU1 and TU2 by a bus BUS2. Disconnectors 26 and 28 are inserted in a portion of the bus BUS2 between the potential current transformer units PU1 and PU2. The disconnector 26 is connectable to a grounded grounding switch 27.

As is obvious from the foregoing two embodiments of the present invention, the potential current transformer units are disposed in the central area, the power receiving units are disposed on the outer side of the potential current transformer units, the transformer side units are disposed on the outer side of the power receiving units, and the buses interconnecting the units are extended in parallel to the row of the cubicles on an upper level and a lower level. Thus, each of the compressed gas insulation switchgears has a very compact construction.

Figure 13:
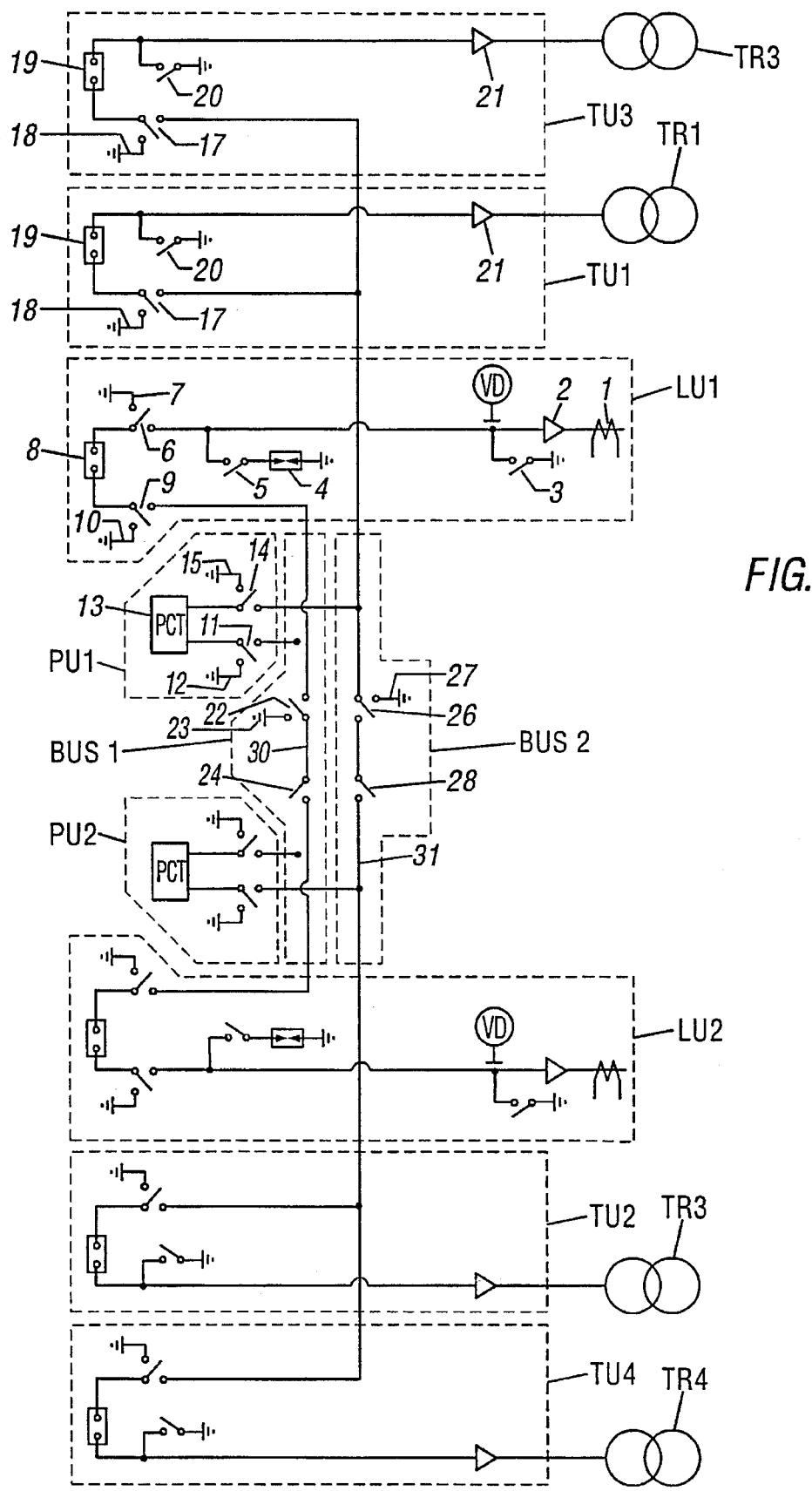
FIG. 13 is a skeleton diagram of a compressed gas insulation switchgear formed by incorporating additional banks to the compressed gas insulation switchgear of FIG. 7.
Figure 14:
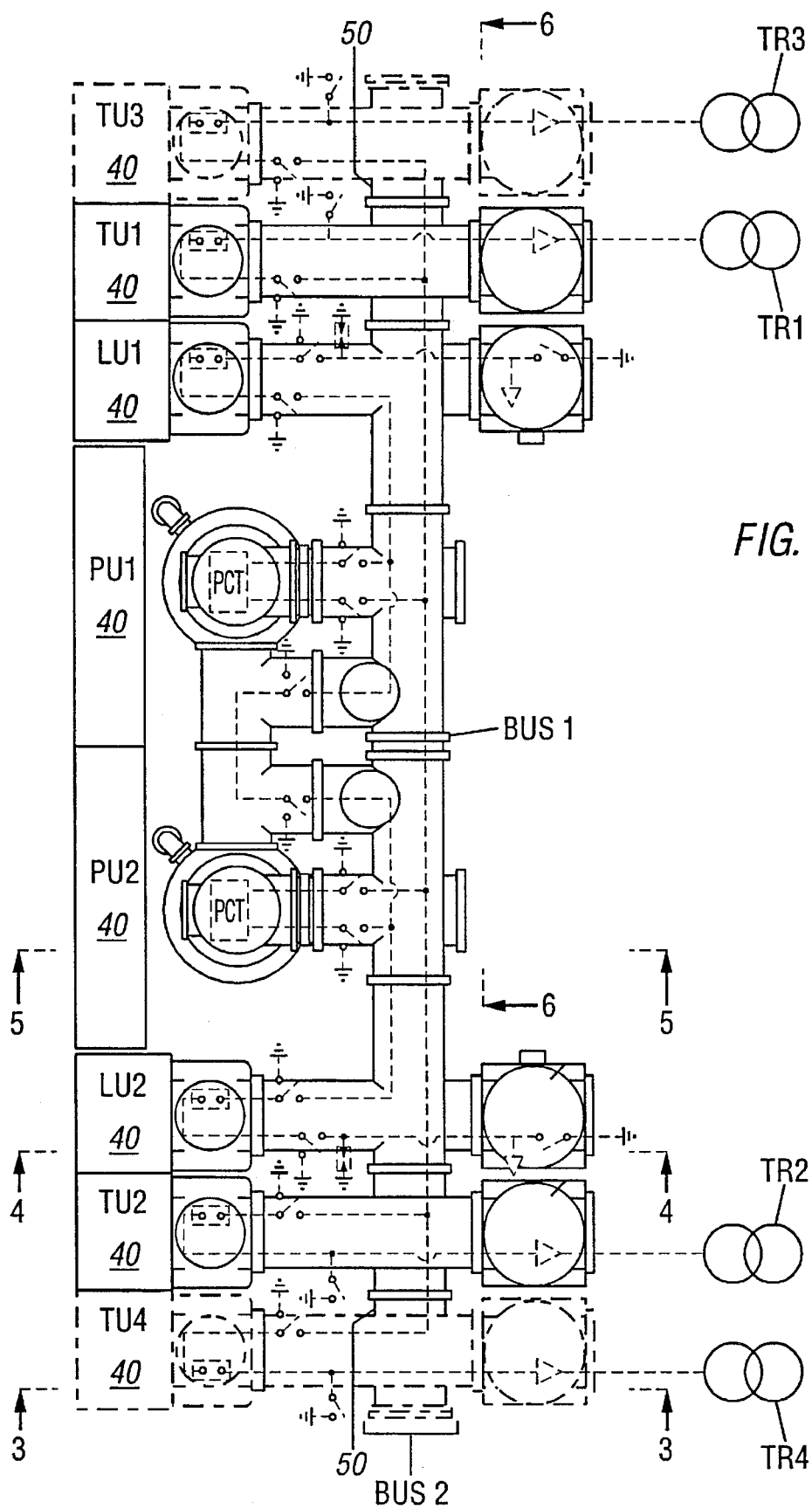
FIG. 14 is a plan view of a compressed gas insulation switchgear formed by incorporating additional banks to the compressed gas insulation switchgear of FIG. 7.

FIG. 13 is a skeleton diagram of a compressed gas insulation switchgear formed by incorporating two additional banks to the compressed gas insulation switchgear shown in FIG. 8 in a skeleton diagram. Two additional transformer side units TU3 and TU4 are identical with the existing transformer side units TU1 and TU2, and are connected to the secondary side bus BUS2. FIG. 14 is a plan view of the compressed gas insulation switchgear of FIG. 13 formed by incorporating the additional banks to the compressed gas insulation switchgear of FIG. 7. The additional transformer side units TU3 and TU4 indicated by alternate long and two short dashes lines in FIG. 14 are identical with the existing transformer side units TU1 and TU2, and a side view of the same is the same as that shown in FIG. 9. When installing the additional transformer side units TU3 and TU4, a connecting bus contained in a bus duct 50 is connected to the bus BUS2. Since the existing transformer side units of the compressed gas insulation switchgear are disposed at the opposite ends of the row of the component units, the additional transformer side units can be very easily installed. Additional transformer side units can be easily incorporated into the compressed gas insulation switchgear of FIG. 1 in the same manner by installing the additional transformer side units identical with the existing transformer side units on the outer side of the existing transformer side units. Thus, the additional transformer side units can be incorporated into the compressed gas insulation switchgear without requiring any additional space other than that necessary for installing the additional transformer side units.

As is apparent from the foregoing description, the compressed gas insulation switchgear in accordance with the present invention comprises the potential current transformer units disposed in the central area, the power receiving units disposed on the outer side of the potential current transformer units, the transformer units disposed on the outer side of the power receiving units, and the buses interconnecting the units and extended in parallel to the row of the cubicles, and is capable of being provided with additional banks without requiring much labor.

What is claimed is:

1. A gas insulation switchgear comprising:

a potential current transformer unit, a power receiving unit, a transformer side unit, wherein:

said potential current transformer unit, said power receiving unit, and said transformer side unit being arranged in a row and electrically connected by buses; and said power receiving unit resides between said potential current transformer unit and said transformer side unit.

2. A switchgear as in claim 1, further comprising multiple potential current transformer units, multiple power receiving units, and multiple transformer side units, and wherein cubicles of said multiple potential current transformer units, multiple power receiving units, and multiple transformer side units, are arranged in a row.

3. A switchgear as in claim 2 wherein said buses are extended in parallel to said row.

4. A switchgear as in claim 3 wherein at least two potential current transformer units are disposed next to each other, and further comprising:

a primary bus connecting the respective primary sides of at least two potential current transformer units to at least two power receiving units and extending on an upper level, and a secondary bus connecting the respective secondary sides of said at least two potential current transformer units to at least two transformer side units and extending on a lower level.

5. A switchgear as in claim 4 wherein the secondary bus has a double bus construction and is extended below the primary bus.

6. A switchgear as in claim 4 wherein said potential current transformer unit, said power receiving unit, and said transformer side unit are disposed on said lower level.

* * * * *